United States Patent [19]

Oda et al.

[11] Patent Number: 4,874,674
[45] Date of Patent: Oct. 17, 1989

[54] METAL-CERAMIC COMPOSITE BODIES

[75] Inventors: Isao Oda; Takao Soma, both of Nagoya, Japan

[73] Assignee: NGK Insulators, Ltd., Nagoya, Japan

[21] Appl. No.: 12,508

[22] Filed: Feb. 9, 1987

[30] Foreign Application Priority Data

Feb. 19, 1986 [JP] Japan .................................. 61-32851

[51] Int. Cl.⁴ ............................................ F16B 11/00
[52] U.S. Cl. .................................... 428/469; 428/451; 428/698
[58] Field of Search ................... 428/172, 35, 36, 451, 428/698, 699, 469

[56] References Cited

U.S. PATENT DOCUMENTS 2,686,655  8/1954  Schorner ......................... 428/172 X

FOREIGN PATENT DOCUMENTS 0156484  10/1985  European Pat. Off. .
0161081  11/1985  European Pat. Off. .
0184457   6/1986  European Pat. Off. .
2169058   7/1986  United Kingdom .

OTHER PUBLICATIONS

Oda et al., EPO 0139406, 5/85.
Patent Abstract of Japan, vol. 10, No. 59 (M-459) [2116], Mar. 8, 1986.
Patent Abstract of Japan, vol. 8, No. 220 (M-330) [1657], Oct. 6, 1984.

Primary Examiner—Nancy A. B. Swisher
Attorney, Agent, or Firm—Arnold, White & Durkee

[57] ABSTRACT

A metal-ceramic composite body is produced by fitting a protruding portion of a ceramic member into a concave portion of an intermediate member and joining the intermediate member to a metallic member. In this case, a difference between the inner diameter in the concave portion of the intermediate member and the outer diameter in the protruding portion of the ceramic member is not less than 0.2% of the outer diameter in the protruding portion when the protruding portion is pulled out from the concave portion.

8 Claims, 6 Drawing Sheets

METAL-CERAMIC COMPOSITE BODIES

BACKGROUND OF THE INVENTION

1. Field of the Invention

This invention relates to a composite body of ceramic and metal.

2. Related Art Statement

Figure 7:
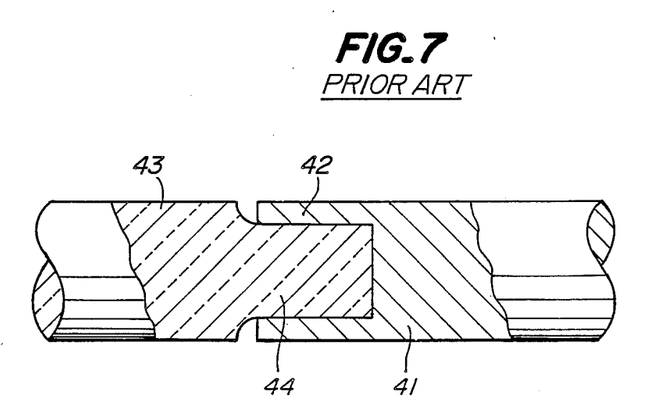
FIG. 7 is a partially sectional view of the conventional metal-ceramic composite body.

As the metal-ceramic composite body, it has generally been produced by forming a concave portion 42 in a joining edge face of a metallic member 41 and fitting a protruding portion 44 of a ceramic member 43 to be joined into the concave portion 42 as shown in FIG. 7.

In the metal-ceramic composite body of the above structure, there is a difference in thermal expansion between the metallic member 41 and the ceramic member 43, so that the joining therebetween is unfastened at a high temperature, and in an extreme case, the ceramic member 43 undesirably comes out from the metallic member 41.

At the fitted end, stress concentrates in the ceramic member due to the compressive pressure in the fitting, and consequently breakage of the composite body may result. Therefore, it is very difficult to obtain metal-ceramic composite bodies having high reliability.

SUMMARY OF THE INVENTION

It is, therefore, an object of the present invention to provide metal-ceramic composite bodies which solve the aforementioned problems and have a high joining strength between a ceramic member and metallic member over a wide temperature range from room temperature to a high temperature, small stress concentration in the ceramic member, and high reliability.

According to the invention, there is the provision of in a metal-ceramic composite body produced by fitting a protruding portion of a ceramic member into a concave portion of a metallic member, the improvement wherein an intermediate member composed of a metal having a low thermal expansion is arranged between the ceramic member and the metallic member and provided at one end with a concave portion for fitting the protruding portion and joined at the other end to the metallic member, and a difference between an outer diameter in the protruding portion of the ceramic member and an inner diameter in the concave portion of the intermediate member is not less than 0.2% of the outer diameter in the protruding portion of the ceramic member when the protruding portion of the ceramic member is pulled out from the concave portion of the intermediate member.

In the preferred embodiment of the invention, a groove is formed substantially over a whole periphery of the protruding portion of the ceramic member and the concave portion of the intermediate member is positioned so as to get an end of the groove as a starting point for the fitting.

BRIEF DESCRIPTION OF THE DRAWINGS

The invention will be described with reference to the accompanying drawings, wherein.

DESCRIPTION OF THE PREFERRED EMBODIMENTS

In the metal-ceramic composite body of the aforementioned construction, the intermediate member of a metal having a low thermal expansion is arranged between the ceramic member and the metallic member, and the difference between an inner diameter in the concave portion of the intermediate member and outer diameter in the protruding portion of the ceramic member when pulling out the protruding portion is not less than 0.2% of the outer diameter of the ceramic member, so that sufficient joining strength can be held over a wide temperature range from room temperature to a high temperature.

According to the invention, the reason why the difference between the outer diameter in the protruding portion of the ceramic member and the inner diameter in the concave portion of the intermediate member when the protruding portion of the ceramic member is pulled out from the concave portion of the intermediate member is limited to not less than 0.2% of the outer diameter of the ceramic member is due to the fact that when such a difference is less than 0.2%, the joining force between the ceramic member and the intermediate member is insufficient and the joining is slackened at a high temperature in use or the ceramic member may become disconnected from the intermediate member in an extreme case as mentioned later.

Further, the stress concentration at the fitted end frequently caused in the conventional techniques can be avoided by forming a groove over a whole periphery of the protruding portion of the ceramic member and positioning the intermediate member as a starting end for the fitting so as to cover a part of the groove.

According to the invention, the depth of the groove formed over the whole periphery of the protruding portion of the ceramic member is 2–12%, preferably 3–8% of the outer diameter in the protruding portion of the ceramic member. When the depth is much shallower to the tension, the effect of mitigating the stress concentration at the fitted end is small, while when it is deeper, the stress concentration due to notch becomes larger as mentioned in detail later.

Figure 1A:
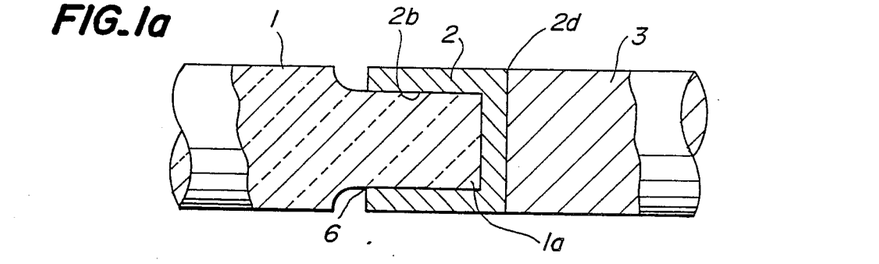
FIGS. 1a to 1d are partially sectional views of embodiments of the metal-ceramic composite body according to the invention, respectively.
Figure 1B:
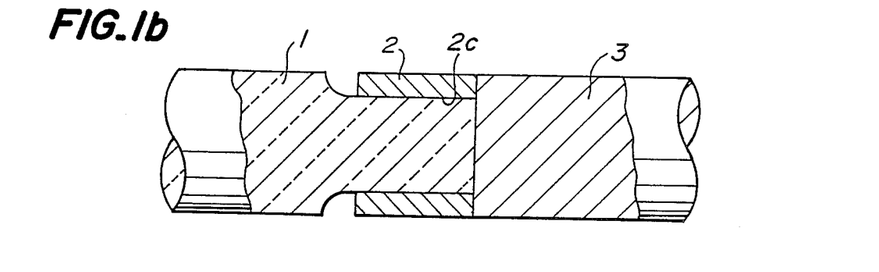
Figure 1C:
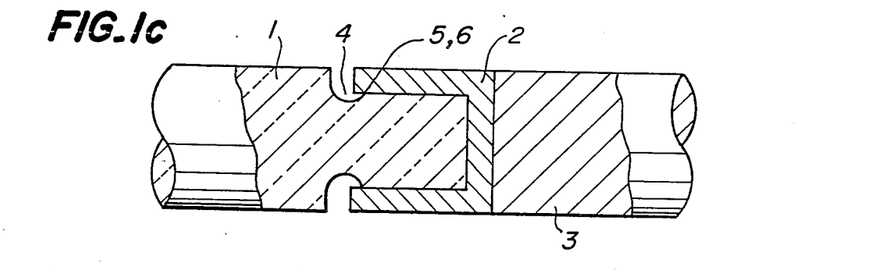
Figure 1D:
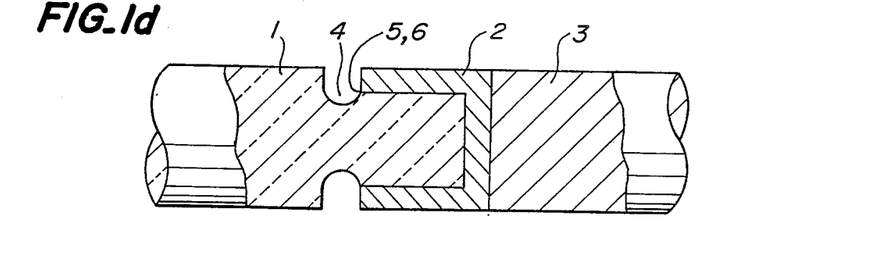

In FIGS. 1a–1d are partly shown in section various embodiments of the metal-ceramic composite body according to the invention. In these embodiments is shown a shaft structure wherein a ceramic member 1, an intermediate member 2 of a metal having a low thermal expansion, and a metallic member 3 are equal in their outer diameters, but the invention is not intended to limit the case that the shaft diameter is equal. In the embodiment, a protruding portion 1a is provided on the end portion of the ceramic member 1, and the ceramic member 1 is joined to the intermediate member 2 by fitting the protruding portion 1a into a concave portion 2b formed at one end of the intermediate member 2 or a through-hole 2c thereof through press fitting or the like. The other end 2d of the intermediate member 2 is joined to the metallic member 3 through friction welding or the like. In the embodiments of FIGS. 1c and 1d, a groove 4 is formed substantially over a whole periphery of the protruding portion 1a of the ceramic member, and the one end 5 of the groove 4 is positioned so as to get a starting point 6 for fitting in the concave portion 2b of the intermediate member 2.

The invention will be described with respect to the following examples.

EXAMPLE 1

Figure 2A:
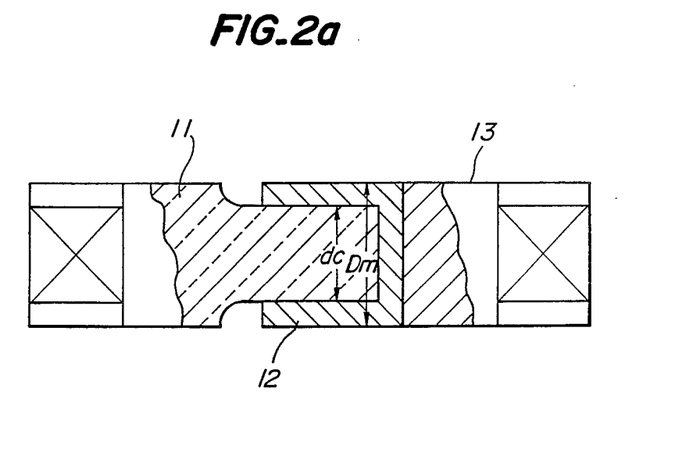
FIGS. 2a and 2b are a schematic view partly shown in section and a side view of the composite body according to the invention used for torsion test, respectively.
Figure 2B:
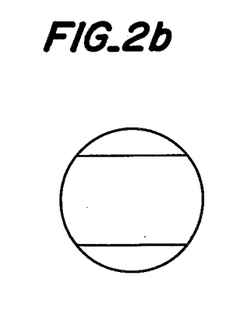
Figure 3:
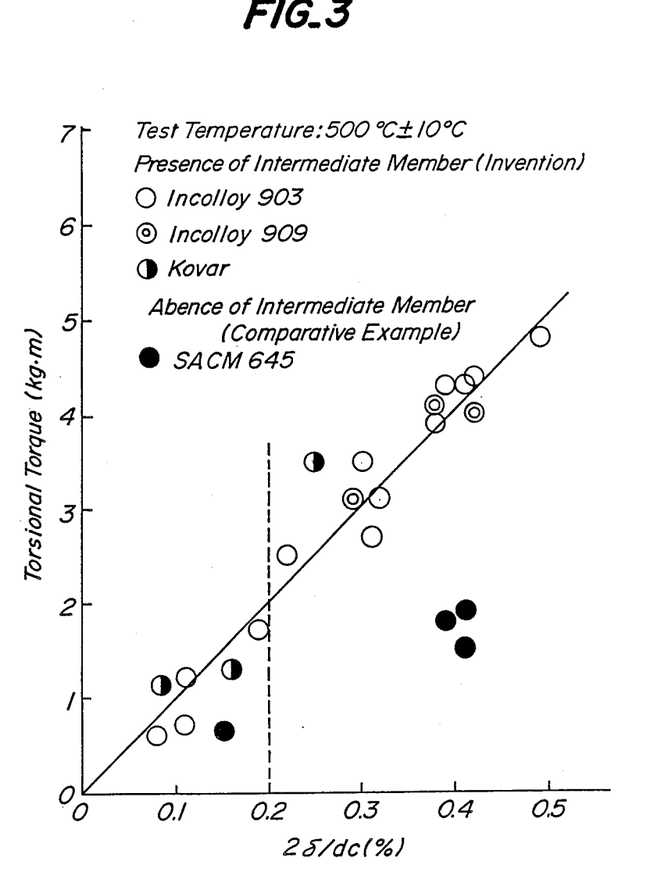
FIG. 3 is a graph showing a relation between torsional torque and $2\delta/dc$.

As shown by section and side views in FIGS. 2a and 2b, a ceramic member 11 composed of $Si_3N_4$ was press fitted into an intermediate member 12 composed of low thermal expansion alloy, Incolloy 903 (trade name) at room temperature, which was then welded to a metallic member 13 composed of SACM 645 to form a composite body for a torsion test. This composite body was subjected to an age treatment at 720° C. for 8 hours and at 620° C. for 10 hours. After a torsional torque was measured at 500° C. by the torsion test, the ceramic member was pulled out from the intermediate member, and the inner diameter dm in the concave portion of the intermediate member 12 and outer diameter dc in the protruding portion of the ceramic member 11 were measured, from which the difference $2\delta$ between the inner diameter dm and outer diameter dc, i.e. $2\delta = dc - dm$ was calculated. The results are shown in FIG. 3. Moreover, the fitted part had such a shape that the diameter of the protruding member 11 was 10 mm, the outer diameter $D_m$ of the intermediate member 12 was 15 mm and the fitting distance was 6 mm. Similarly, the torsional torque and $2\delta$ were measured by using Incolloy 909 and Kovar as the intermediate member to obtain results as shown in FIG. 3. Furthermore, the thermal expansion coefficient of each of the metals is shown in the following Table 1.

TABLE 1

| Kind of metal | Thermal expansion coefficient (room temperature-500° C.) × $10^{-6}$/°C. |
| --- | --- |
| Incolloy 903 | 8 |
| Incolloy 909 | 8 |
| Kovar | 6 |
| SACM 645 | 14 |
| SNCM 439 | 14 |

As seen from FIG. 3, the torsional torque in the products according to the invention containing the intermediate member 12 composed of low thermal expansion metal having $2\delta/dc$ of about 0.4% is 3.9–4.4 kg.m, while the torsional torque of the product containing no intermediate member is 1.5–1.9 kg.m so as not to provide sufficient joining force. On the other hand, even when the product has the intermediate member, if $2\delta/dc$ is not less than 0.2%, the torsional torque is more than 2 kg.m and the sufficient fitting force is obtained, while if $2\delta/dc$ is less than 0.2%, the sufficient joining force is not obtained.

EXAMPLE 2

Figure 4:
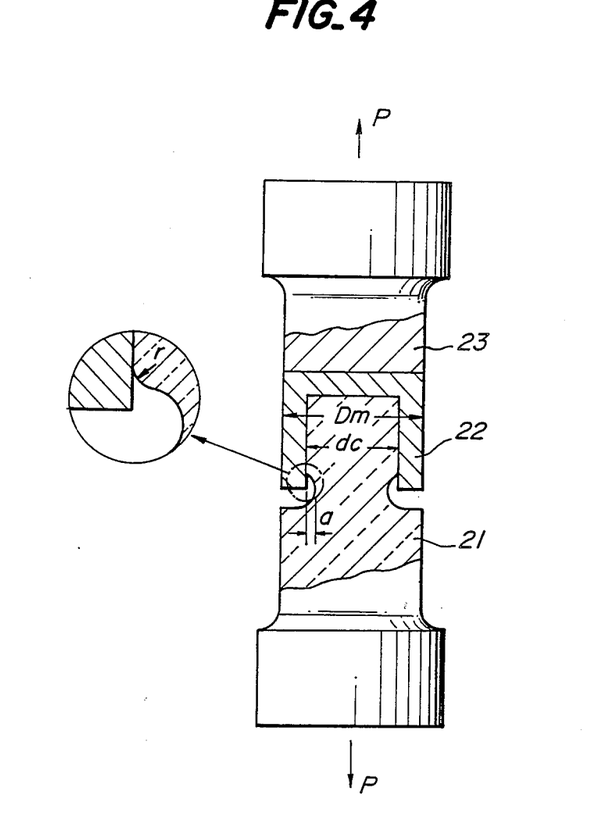
FIG. 4 is a partially sectional view of the composite body according to the invention used for tension test.
Figure 5A:
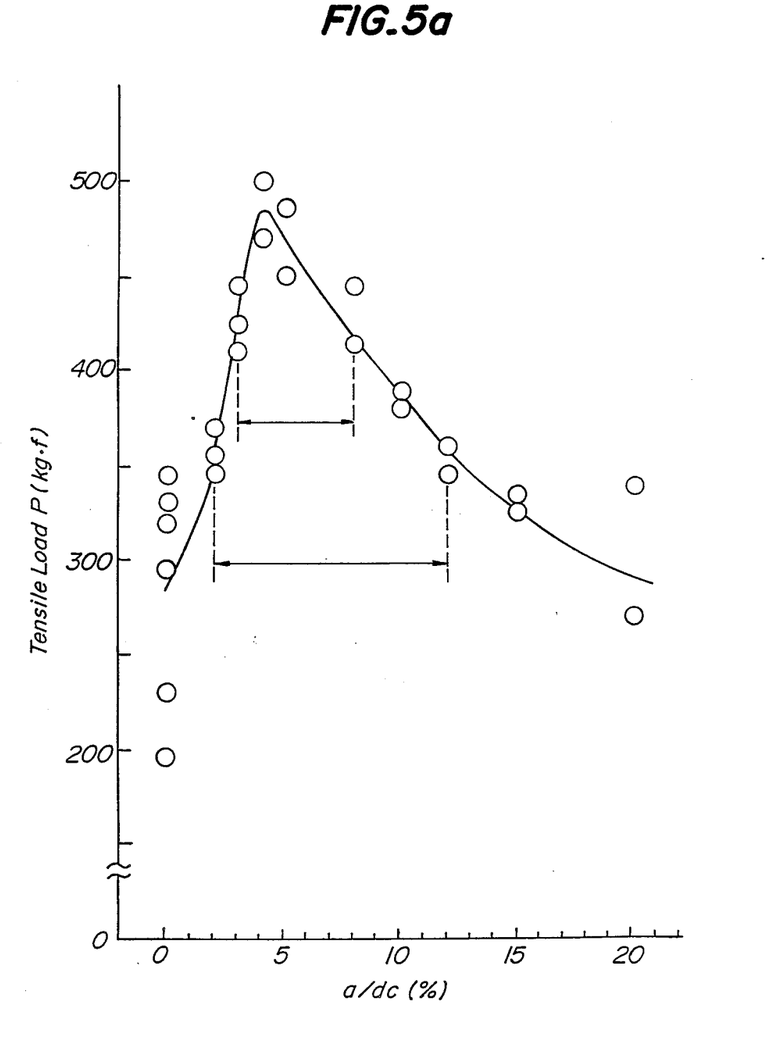
FIG. 5a is a graph showing a relation between tensile load and $a/dc$.
Figure 5B:
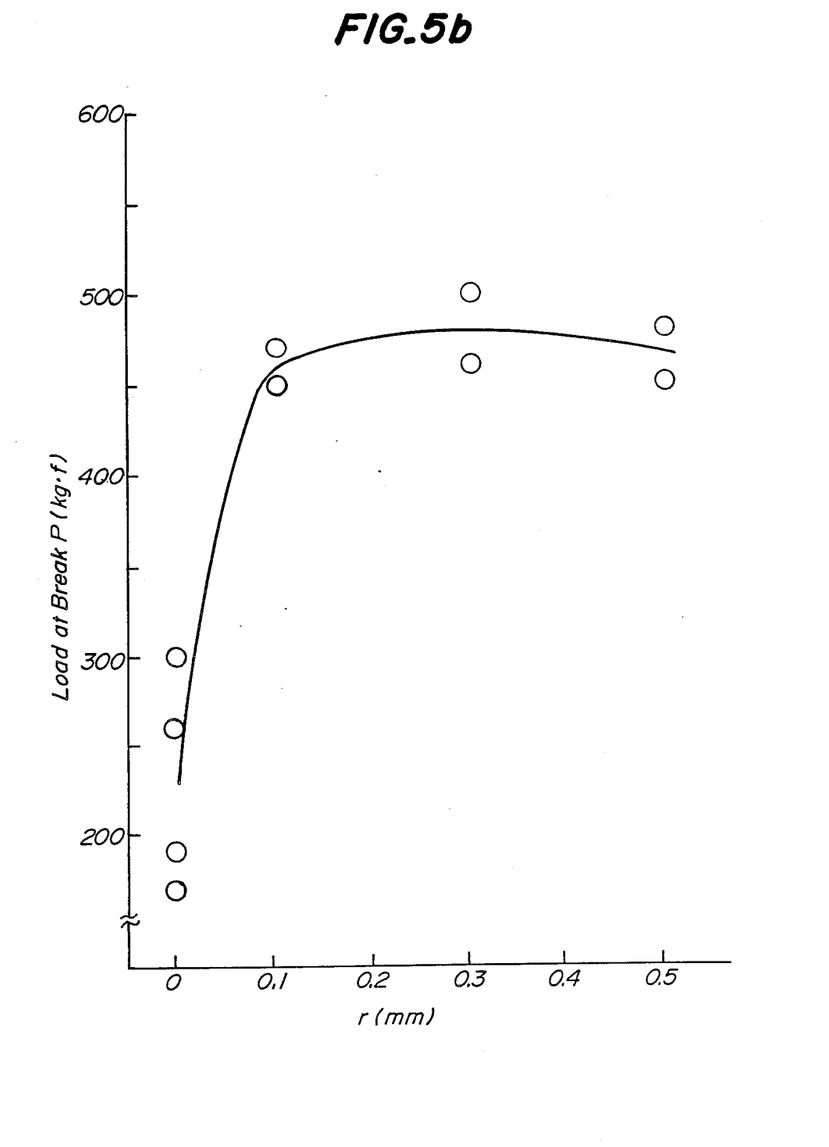
FIG. 5b is a graph showing a relation between load at break and radius of curvature r in groove end located at starting point for fitting.

A composite body for tension test was produced by press fitting a ceramic member 21 of $Si_3N_4$ into an intermediate member 22 composed of Incolloy 903 and welding it to a metallic member 23 composed of SNCM 439 as shown in FIG. 4, and then the load at break was measured under loading P shown in FIG. 4. The results measured on a relation between the depth a of the groove and the tensile load P when the radius of curvature r of the groove end at the starting point for the fitting is about 0.3 mm are shown in FIG. 5a, while the results measured on a relation between the radius of curvature r of the groove end and the load at break P when the groove depth a is $a/dc = 4\%$ are shown in FIG. 5b. Moreover, the fitted part had such a shape that the diameter of the protruding portion of the ceramic member 21 was 11 mm, the outer diameter $D_m$ of the intermediate member 22 was 16 mm, the fitting distance was 8 mm and $2\delta/dc = 0.4\%$.

As seen from FIG. 5a, when the depth a of the groove formed in the metal-ceramic composite body according to the invention is 2–12% of the outer diameter dc in the protruding portion of the ceramic member, the sufficient tensile strength is obtained, and particularly the tensile strength is excellent when the depth is 3–8%.

As seen from FIG. 5b, when the end of the groove at the starting point for the fitting is rounded at a radius of curvature of $r \geq 0.1$ mm, the sufficient joining strength is obtained.

EXAMPLE 3

Figure 6:
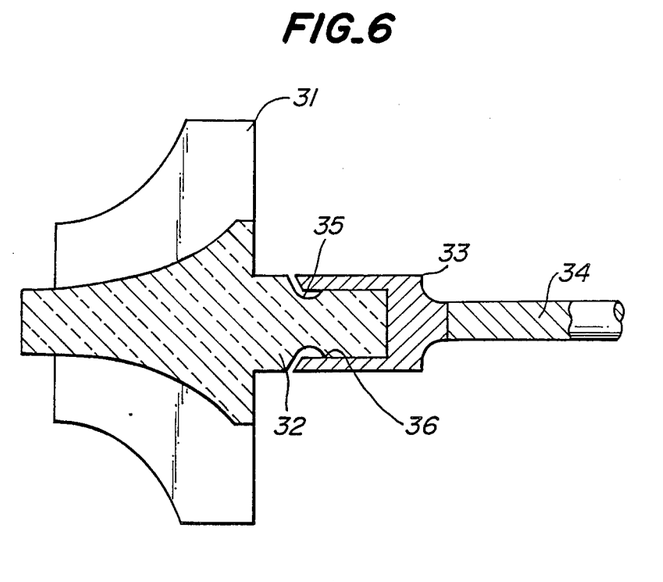
FIG. 6 is a partially sectional view of an embodiment of applying the composite body according to the invention to a ceramic turbocharger rotor.

FIG. 6 is a partially sectional view of a ceramic turbocharger rotor using the composite body according to the invention. In this example, a large shaft portion 32 of 10 mm in outer diameter in a turbine wheel 31 of $Si_3N_4$ having a diameter of 41 mm was fitted into an intermediate member 33 having an outer diameter $D_m$ of 15 mm, which was joined through friction welding to a metallic shaft 34 of SNCM 439. Further, a groove 35 having a depth of $a = 0.5$ mm was formed over a whole periphery of the protruding portion of the ceramic shaft and the intermediate member was positioned so as to get the groove end 36 as a starting point for the fitting. The hardness of the shaft portion of SNCM 439 was adjusted by high frequency quenching and tempering.

The ceramic turbocharger rotor was assembled into a high temperature rotating testing machine and then the rotating test was carried out at a rotational frequency of 100,000 rpm under a combustion gas of 800° C. for 50 hours. As a result, no accidents were observed.

After the pulling out of the ceramic turbocharger rotor, $2\delta/dc$ was 0.42%.

From the above results, it was confirmed that sufficient joining strength can be maintained over a wide temperature range of from room temperature to a high temperature when the intermediate member composed of a low thermal expansion metal is arranged between the ceramic member and the metallic member and the difference between the inner diameter in the concave portion of the intermediate member and the outer diameter in the protruding portion of the ceramic member at the time of pulling the fitted part is not less than 0.2%, and that the strength at the fitted part can be enhanced by arranging the groove over the whole periphery of the protruding portion of the ceramic member and positioning the concave portion of the intermediate member so as to get an end of the groove as a starting point for the fitting.

The invention is not limited to the above examples and makes possible to various changes and modifications. For instance, silicon carbide, sialon, zirconia, mullite, alumina, beryllia and the like may be used as a ceramic material in addition to $Si_3N_4$. Furthermore, all of the low thermal expansion metals other than Incolloy 903, Incolloy 909 and Kovar may also be used as the intermediate member. Moreover, SNCM 439 and SACM 645 as well as the other metals can be used as the metallic member.

As mentioned above, according to the invention, the intermediate member of low thermal expansion metal is arranged between the ceramic member and the metallic member and the difference between the inner diameter in the concave portion of the intermediate member and the outer diameter in the protruding portion of the ceramic member after the pulling out of the fitted part is limited to a certain range, whereby the joining strength is made higher over a wide range from room temperature to a high temperature and also the stress concentration at the fitted end is avoided due to the presence of the groove formed in the protruding portion of the ceramic member, so that metal-ceramic composite bodies having high reliability can be obtained.

What is claimed is:

1. A metal-ceramic composite body comprising:
   a ceramic member having a protruding portion;
   a metallic member; and
   an intermediate metallic member positioned between said ceramic member and said metallic member, said intermediate metallic member having a thermal expansion coefficient which is lower than that of said metallic member, said intermediate metallic member having a first end including a concave portion in which said ceramic protruding portion is fitted and a second end joined to said metallic member;
   wherein a difference between an outer diameter of said ceramic protruding portion and an inner diameter of said concave portion, after said protruding portion is pulled from said concave portion, is not less than 0.2% of said outer diameter.

2. A metal-ceramic composite body comprising:
   a ceramic member having a protruding portion and a groove formed in its outer periphery;
   a metallic member; and
   an intermediate metallic member positioned between said ceramic member and said metallic member, said intermediate metallic member having a thermal expansion coefficient which is lower than that of said metallic member, said intermediate metallic member having a first end including a concave portion in which said ceramic protruding portion is fitted and a second end joined to said metallic member, said concave portion being positioned such that one end of said groove provides a starting point for a fitting surface between said ceramic protruding portion and said concave portion;
   wherein a difference between an outer diameter of said ceramic protruding portion and an inner diameter of said concave portion, after said protruding portion is pulled from said concave portion, is not less than 0.2% of said outer diameter.

3. A metal-ceramic composite body according to claim 2, wherein said groove has a depth equal to about 2-12% of said outer diameter.

4. A metal-ceramic composite body according to claim 3, wherein said depth is equal to about 3-8% of said outer diameter.

5. A metal-ceramic composite body according to claim 2, wherein said one end of said groove has a radius of curvature equal to about 0.3 mm.

6. A metal-ceramic composite body according to claim 1, wherein said protruding member is fitted into said concave portion by at least one method selected from the group consisting of press fitting, expansion fitting, and contraction fitting.

7. A metal-ceramic composite body according to claim 1, wherein said second end of said intermediate metallic member is joined to said metallic member by friction welding.

8. A metal-ceramic composite body according to claim 1, wherein said composite body is a rotating shaft for a turbocharger rotor or a gas turbine rotor.

* * * * *